United States Patent
Gall et al.

(10) Patent No.: US 7,337,208 B2
(45) Date of Patent: *Feb. 26, 2008

(54) COMPUTER SYSTEM AND METHOD FOR SHARING A JOB WITH OTHER COMPUTERS ON A COMPUTER NETWORK USING IP MULTICAST

(76) Inventors: Thomas Alan Gall, 1117 5th Ave. SE., Rochester, MN (US) 55904; Jeffery David Haumont, 863 21st Ave. SE., #E200, Rochester, MN (US) 55904

( * ) Notice: Subject to any disclaimer, the term of this patent is extended or adjusted under 35 U.S.C. 154(b) by 1044 days.

This patent is subject to a terminal disclaimer.

(21) Appl. No.: 09/971,176

(22) Filed: Oct. 4, 2001

(65) Prior Publication Data

US 2002/0016811 A1 Feb. 7, 2002

Related U.S. Application Data

(62) Division of application No. 09/287,435, filed on Apr. 7, 1999.

(51) Int. Cl.
*G06F 13/00* (2006.01)
*G06F 17/30* (2006.01)

(52) U.S. Cl. .................. 709/201; 709/220; 709/228; 713/201

(58) Field of Classification Search ............... 709/203, 709/206, 217, 218, 220, 224, 225, 228, 232, 709/226, 201, 227; 370/466, 467, 432, 397; 374/228; 455/3.1; 713/201

See application file for complete search history.

(56) References Cited

U.S. PATENT DOCUMENTS

| | | | | |
|---|---|---|---|---|
| 5,517,622 A | * | 5/1996 | Ivanoff et al. ............... 709/232 |
| 5,539,883 A | * | 7/1996 | Allon et al. ................. 709/201 |
| 5,548,728 A | | 8/1996 | Danknick .................... 709/706 |
| 5,603,029 A | * | 2/1997 | Aman et al. .................... 709/6 |
| 5,689,553 A | * | 11/1997 | Ahuja et al. ............ 379/202.01 |
| 5,765,033 A | * | 6/1998 | Miloslavsky ................. 709/206 |
| 5,774,660 A | * | 6/1998 | Brendel et al. .............. 709/201 |
| 5,862,329 A | * | 1/1999 | Aras et al. ................... 709/204 |
| 5,987,118 A | * | 11/1999 | Dickerman et al. ..... 379/265.01 |
| 6,014,545 A | | 1/2000 | Wu et al. ..................... 455/3.1 |

(Continued)

*Primary Examiner*—Khanh Dinh

(57) ABSTRACT

A computer system on a network uses IP multicast to recruit other computer systems to share in the processing of a job. If a computer system on the network wants to be available to process shared jobs, it first registers for job sharing by invoking an IP multicast router at a particular IP address. All messages sent to the IP multicast router are broadcast to all computer systems that are registered with the router. When a computer system has a job to share, it recruits other computer systems to help process the job by sending a message to the IP multicast router that corresponds to a request to share the job. The candidate computer systems that receive the recruiter's broadcast determine if they can share the job according to one or more job sharing parameters. These parameters may relate to the job itself, network performance, security, or other criteria for sharing. If a computer system meets the parameters for taking on the particular job, it responds to the recruiter. If the recruiter still needs help (e.g., if not enough candidate systems have responded yet), the recruiter grants the response and delivers the job to the computer system. The computer system then performs the job (or task) and returns the results to the recruiter.

8 Claims, 4 Drawing Sheets

U.S. PATENT DOCUMENTS

| | | | |
|---|---|---|---|
| 6,049,823 A | 4/2000 | Hwang | 709/218 |
| 6,427,071 B1 * | 7/2002 | Adams et al. | 455/403 |
| 6,718,387 B1 * | 4/2004 | Gupta et al. | 709/226 |
| 6,751,221 B1 * | 6/2004 | Saito et al. | 370/392 |

* cited by examiner

COMPUTER SYSTEM AND METHOD FOR SHARING A JOB WITH OTHER COMPUTERS ON A COMPUTER NETWORK USING IP MULTICAST

RELATED APPLICATION

This patent application is a divisional application of an application with the same title, U.S. Ser. No. 09/287,435, filed on Apr. 7, 1999, which is incorporated herein by reference.

BACKGROUND OF THE INVENTION

1. Technical Field

This invention generally relates to data processing, and more specifically relates to the sharing of jobs between computers on a network.

2. Background Art

Since the dawn of the computer age, computer systems have become indispensable in many fields of human endeavor including engineering design, machine and process control, and information storage and access. In the early days of computers, companies such as banks, industry, and the government would purchase a single computer which satisfied their needs, but by the early 1950's many companies had multiple computers and the need to move data from one computer to another became apparent. At this time computer networks began being developed to allow computers to work together.

Networked computers are capable of performing jobs that no single computer could perform. In addition, networks allow low cost personal computer systems to connect to larger systems to perform tasks that such low cost systems could not perform alone. Most companies in the United States today have one or more computer networks. The topology and size of the networks may vary according to the computer systems being networked and the design of the system administrator. It is very common, in fact, for companies to have multiple computer networks. Many large companies have a sophisticated blend of local area networks (LANs) and wide area networks (WANs) that effectively connect most computers in the company to each other.

With so many computers hooked together on a network, it soon became apparent that networked computers could be used to process large jobs by delegating different portions of the job to different computers on the network, which can then process their respective portions in parallel. In particular, many computers on a network may have excess computing capacity, or may have periods when they are not being used. These computers could be made productive by working on a portion of a large job with little or no expense, because the computing power is already present but unused.

Known techniques for sharing jobs among computers on a network require knowledge specific to processing the job to be included in the client software installed on each computer system. Thus, if a person defines a new job that would benefit from being processed on several different computers in the network, the client software on the computers must be upgraded to support the new job. The prior art thus effectively precludes dynamic recruiting of systems to work on new types of jobs. Without a mechanism for allowing computer systems on a network to dynamically interact to share jobs without having to pre-define the jobs being processed, the scope of shared jobs will be greatly limited, and excess computing capacity on computer networks will remain an untapped resource.

DISCLOSURE OF INVENTION

According to the present invention, a computer system on a network uses IP multicast to recruit other computer systems to share in the processing of a job. If a computer system on the network wants to be available to process shared jobs, it first registers for job sharing by invoking an IP multicast router at a particular IP address. All messages sent to the IP multicast router are broadcast to all computer systems that are registered with the router. When a computer system has a job to share, it recruits other computer systems to help process the job by sending a message to the IP multicast router that corresponds to a request to share the job. The candidate computer systems that receive the recruiter's broadcast determine if they can share the job according to one or more job sharing parameters. These parameters may relate to the job itself, network performance, security, or other criteria for sharing. If a computer system meets the parameters for taking on the particular job, it responds to the recruiter. If the recruiter still needs help (e.g., if not enough candidate systems have responded yet), the recruiter grants the response and delivers the job to the computer system. The computer system then performs the job (or task) and returns the results to the recruiter.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Figure 1:
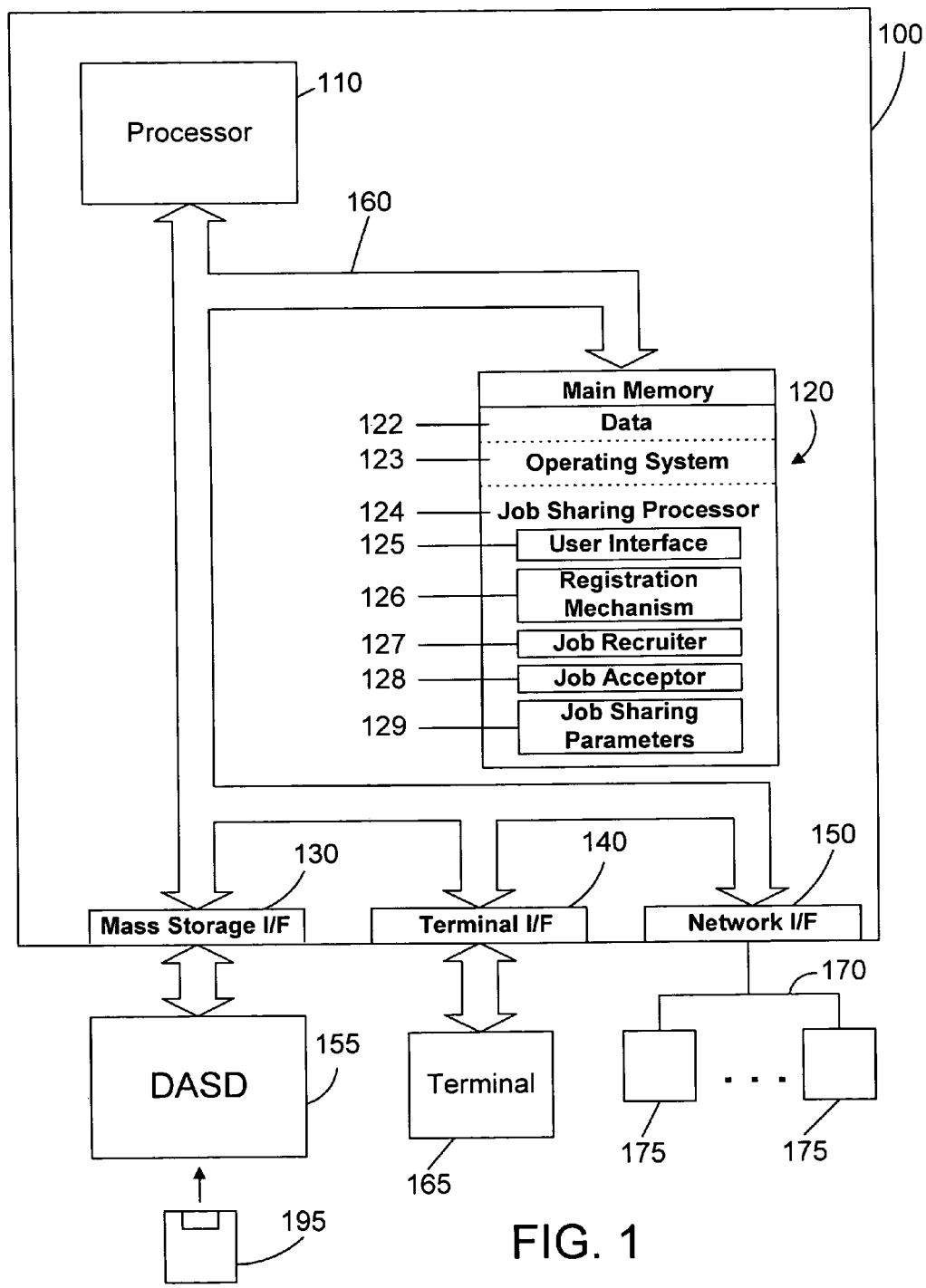
FIG. 1 is a block diagram of a computer system that may be networked with other computer systems in accordance with a preferred embodiment of the present invention.

The present invention is accomplished through sharing portions of jobs on computers that are connected on a network. For those who are not familiar with networking concepts, the brief overview below provides background information that will help the reader to understand the present invention.

1. Overview

Networked Computer Systems

Connecting computers together on a network requires some form of networking software. Over the years, the power and sophistication of networking software has greatly increased. Networking software typically defines a protocol for exchanging information between computers on a network. Many different network protocols are known in the art. Examples of commercially-available networking software is Novell Netware and Windows NT, which each implement different protocols for exchanging information between computers.

One significant computer network that has recently become very popular is the Internet. The Internet grew out of a proliferation of computers and networks, and has evolved into a sophisticated worldwide network of computer systems. Using the Internet, a user may access computers all over the world from a single workstation. TCP/IP (Transmission Control Protocol/Internet Protocol) is an example of a network protocol that is in wide use today for communicating between computers on the Internet. In addition, the use of TCP/IP is also rapidly expanding to more local area networks (LANs) and Intranets within companies. With so many computers connected together both inside of a company and with others outside the company via the Internet, it would be very helpful if there was a way to efficiently share jobs between these computers.

Job Sharing on a Network Using Rem and Rcomp

Recent efforts have recognized that computers that are networked together may be used to process different portions of a large job. For the purpose of discussing job sharing in this patent application, a computer system that wants help in processing a job is referred to herein as a "recruiter", and a computer system that may possibly help in performing the job is referred to as a "candidate". Of course, a recruiter for one job can become a candidate for other jobs. The term "job" as used herein in a generic sense to refer to both large problems that have smaller portions that need to be apportioned to different computer systems, and also to the individual portions (e.g., tasks) that are apportioned as well.

In one known method for job sharing, a remote command "rem" may be invoked by a recruiter. A computer system on the network referred to herein as a "rem server" is dedicated to responding to the rem command to find an available candidate. In response to the rem command, the rem server locates an idle machine on the network, and executes a command on the idle machine to share a job. Known techniques of communicating between computers using text input and output protocols are used to communicate between the recruiter and the candidate. Note that invoking the rem command results in finding a single candidate for sharing a job.

Another known method for sharing a job relates to compiling source code. Source code is computer code that is written in a high-level human-readable programming language that must be translated to a machine-readable version that is executable on a processor. Source code is usually arranged in modules. Each module is generally a separate compilation unit, which means it can be compiled separately from other modules. When a large program is programmed in a modular fashion, the compilation of different modules can be performed by different computers. Compiling source code is a common step in software development that takes a very long time to perform for complex computer programs. By farming out the compilation of different modules to different computer systems on a network, the compilation time can be drastically reduced. One known method for compiling different modules on different computer systems uses an "rcomp" command, which stands for "remote compile".

Using the rcomp command assumes that there are certain machines on the network that are known as "compile servers", those machines with the appropriate compilers installed and that have available resources to run compilations. When an rcomp command is invoked by a recruiter, a computer system that is dedicated to handling rcomp commands (referred to herein as an "rcomp server") examines the available compile servers on the network to determine whether they are compatible compile servers, and whether they have sufficient capacity to perform the requested compilation. When searching for compile servers, preference is given to larger compile servers and to compile servers that do not have other rcomp jobs running on them. Once a candidate compile server is selected, the rcomp server executes a command on the candidate that sends messages via text output back to the recruiter, and that optionally receives messages via text input from the recruiter.

Rcomp is generally used for commands (such as compilations) that require more resources than are available on the recruiter. It is typically not intended for small or interactive jobs.

One problem with both rem and rcomp is that these commands are limited to certain types of tasks. Client software must be installed on each candidate system that only knows how to process particular tasks in pre-defined ways defined in the client software. There are many different types of relatively large and complex problems that could be solved using rem and rcomp techniques, but these techniques would require that the client software on each candidate system, as well as the recruiter, have specific knowledge and logic for processing pre-defined problems. This hurdle prevents a recruiter from using any candidate that does not support the function it needs to perform.

IP Multicast

The concept of IP Multicast can best be understood by providing an analogy to commonly-known radio transmitters and receivers. A radio transmitter, such as a transmitter for a local radio station, continuously broadcasts its programming on a particular frequency. To listen to the radio station, one must tune a radio receiver to the frequency corresponding to the radio station's transmitter. An IP Multicast router performs functions analogous to a radio transmitter—it continuously broadcasts information to any computer systems that are "tuned in" to the multicast channel. A computer system effectively "tunes in" by invoking a particular reserved Internet Protocol (IP) address corresponding to the multicast router to register with the multicast router. Once registered, the computer system will receive all messages broadcast by the multicast router. One significant difference between IP multicast and the radio analogy is that computer systems, once registered with the multicast router, can also send messages to the router for distribution to all of the registered computer systems. In this manner a computer system can communicate with a large number of other computer systems at the same time without individually communicating with each one, and without knowing what other computer systems are job sharing candidates.

There exist a good number of different protocols and methods for performing IP multicast that are known in the art. The present invention expressly encompasses any and all methods, whether currently known or developed in the future, for performing IP multicast on a network.

2. Detailed Description

According to a preferred embodiment of the present invention, a computer system registers with an IP multicast router for job sharing, then receives all messages that are sent to that router. When a computer wants help in processing a job, it is referred to herein as a recruiter, and sends a recruiting message to the IP multicast router, which routes the message to all registered computer systems. These registered computer systems are candidates to share the job. Each candidate looks to see if it can share the job, and if it can, it responds to the recruiter. If the recruiter still needs help when the candidate responds, it sends the job to the candidate for processing The candidate then processes the job and returns the results to the recruiter.

Referring to FIG. 1, a computer system 100 is an enhanced IBM AS/400 computer system, and represents one suitable type of computer system that can be networked together in accordance with the preferred embodiment Those skilled in the art will appreciate that the mechanisms and apparatus of the present invention apply equally to any computer system that can be networked together with other computer systems. As shown in FIG. 1, computer system 100 comprises a processor 110 connected to a main memory 120, a mass storage interface 130, a terminal interface 140, and a network interface 150. These system components are interconnected through the use of a system bus 160. Mass storage interface 130 is used to connect mass storage devices (such as a direct access storage device 155) to computer system 100. One specific type of direct access storage device is a floppy disk drive, which may store data to and read data from a floppy diskette 195.

Main memory 120 contains data 122, an operating system 123, and a job sharing processor 124. Job sharing processor 124 includes a user interface 125, a registration mechanism 126, a job recruiter 127, a job acceptor 128, and one or more job sharing parameters 129. Job sharing processor 124 handles both requests by computer system 100 for sharing a job with other computer systems, as well as requests by other computer systems for computer system 100 to share a job. In other words, computer system 100 may be a recruiter for a job it controls, then can be a candidate for jobs that are controlled by other computer systems.

Data 122 represents any data that serves as input to or output from any program in computer system 100. Operating system 123 is a multitasking operating system known in the industry as OS/400; however, those skilled in the art will appreciate that the spirit and scope of the present invention is not limited to any one operating system. Job sharing processor 124 includes a user interface 125 that allows a user to specify parameters relating to job sharing in general, relating to a specific job to be shared, or relating to performance, security, or other parameters.

User interface 125 provides a mechanism for a user to specify one or more acceptance parameters for allowing computer system 100 to undertake shared jobs from other computer systems. For example, a menu could allow a user to specify default times for allowable shared jobs, such as at lunch and during the hours the user is not at work. In addition, the user could dynamically enter allowable times for shared jobs. If the user has a two hour meeting in the afternoon, for example, during which the user will be away from his computer (and therefore not using it), the user could simply enter the time of the meeting as an allowable time period for shared jobs. In addition, the user interface 125 also provides an operation that allows a user to cancel (i.e., kill) jobs that are processing. Thus, if the user blocks out a two hour time block as allowable job sharing time because of a meeting, and returns from the meeting an hour early to find his computer engaged in processing a shared job, the user may abort the job to regain the full processing capacity of the user's computer system. The aborted job will then have to be re-started elsewhere on the network.

In addition to setting times for allowable shared jobs, a user may also setup certain job sharing parameters 129 via user interface 125. These parameters may include attributes regarding the job to be shared, the candidates for sharing the job, network performance, and security. These specific attributes are discussed in more detail below with reference to FIG. 3.

Job sharing processor 124 includes a registration mechanism 126 for registering computer system 100 for shared jobs. Registration mechanism 126 includes intelligence for performing predefined functions required by the specifics of the implemented IP multicast protocol to add computer system 100 to the list of recipients for IP multicast messages. For some IP multicast systems, registration is simply a matter of invoking a command at a predetermined IP address that corresponds to the IP multicast router. The mechanics of how to register to receive IP multicasts are known in the art, and are not discussed in detail herein. All mechanisms and methods for registering computer system 100 for shared jobs are within the scope of the present invention.

Job sharing processor 124 includes a job recruiter 127 and a job acceptor 128. Job recruiter 127 is that portion of job sharing processor 124 that recruits other computer systems to help in processing a shared job. Job acceptor 128 is that portion of job sharing processor 124 that monitors recruiting requests from other computer systems to help in processing a shared job, and that determines whether or not to respond to the request.

Job sharing parameters 129 are a collection of attributes relating to job sharing. In the case of a job to be shared with other computer systems (i.e., when computer system 100 is a recruiter), job sharing parameters 129 may include recruiting parameters for the job to be shared that candidate computer systems must meet to accept a job from the recruiter. In the case of sharing a job from other computer systems (i.e., when computer system 100 is a candidate), job sharing parameters may include acceptance attributes that determine whether or not computer system 100 may be used to process the shared job. Examples of possible attributes contained within job sharing parameters 129 are discussed below with reference to FIG. 3.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 122, operating system 123, and job sharing processor 124 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 123. Operating system 123 is a sophisticated program that manages the resources of computer system 100. Some of these resources are processor 110, main memory 120, mass storage interface 130, terminal interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces (called input/output processors in AS/400 terminology) that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100. Note, however, that while terminal interface 140 is provided to support communication with one or more terminals 165, computer system 100 does not necessarily require a terminal 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

Figure 2:
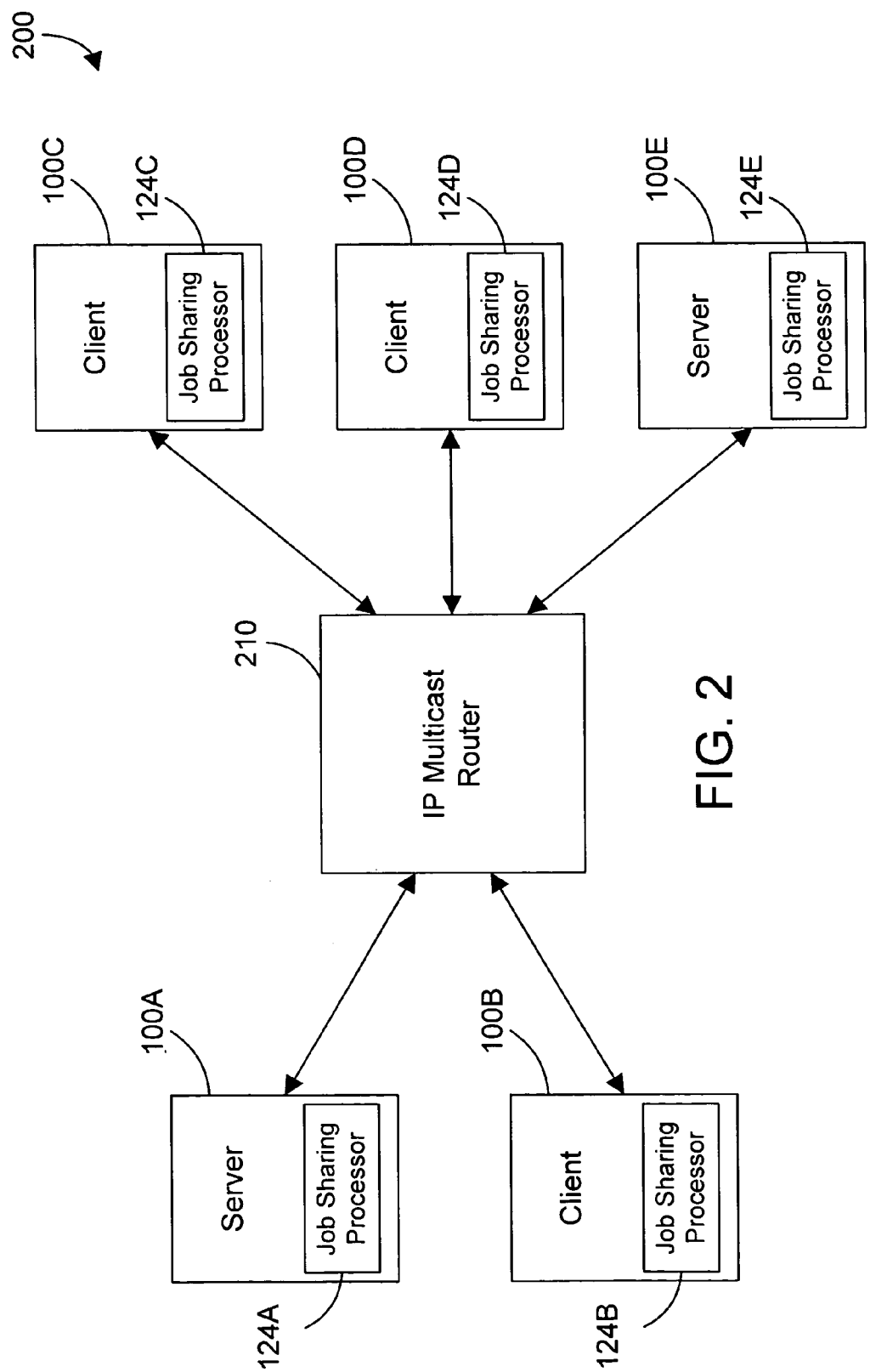
FIG. 2 is a block diagram of several computer systems of FIG. 1 that are all coupled together on a network via an IP multicast router.

Referring to FIG. 2, one particular example of a networked computer system 200 in accordance with the preferred embodiments includes multiple computer systems 100 of FIG. 1, shown in FIG. 2 as 100A through 100E, all coupled to an IP multicast router 210. Any message sent by any of computer systems 100A through 100E to IP multicast router 210 are automatically broadcast to all computer systems that are registered with IP multicast router 210. The configuration of FIG. 2 assumes that each of these computer systems 100A-100E has previously registered with IP multicast router 210, and is therefore a candidate for job sharing. Each computer system has a corresponding job sharing processor 124. Note that computer system 100A and 100E are designated as servers, and computer systems 100B, 100C, and 100D are designated as clients. These designations are arbitrary, and simply show that jobs may be shared between client computer systems, between server computer systems, between clients and servers, or between servers and clients. In other words, computer systems 100 can be any suitable type of computer, and are not even limited to client or server computer systems. Job sharing processor 124 includes the functionality for both recruiting other computer systems to help process a job, as well as helping other computer systems to process their jobs.

Figure 3:
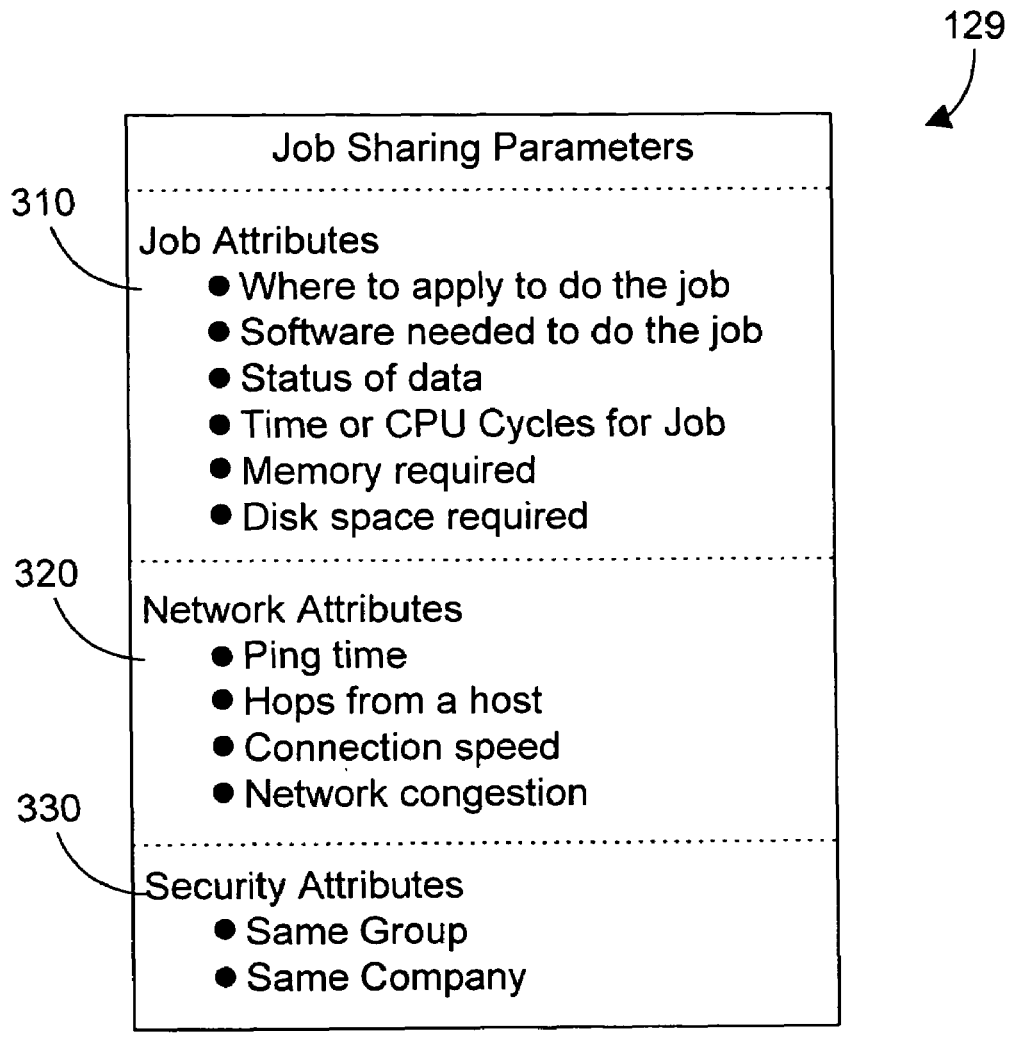
FIG. 3 is a block diagram showing several possible job sharing parameters.

Referring to FIG. 3, one specific implementation for job sharing parameters 129 of FIG. 1 includes three different classes of attributes. Job attributes 310 define attributes of the job to be shared. Network attributes 320 define network performance parameters that must be met for a candidate computer system to be able to accept a job to be shared. Security attributes 330 define attributes that must be met for a candidate computer system to be able to accept a job to be shared. Note that these three classes of attributes are shown by way of example, and other classes and types of attributes are clearly within the scope of the preferred embodiments disclosed herein.

Job attributes 310 include information relating to the job to be shared. Examples of suitable information that may be included in job attributes 310 include: where (i.e., what IP address) to apply to do the job; software that must be installed on the candidate computer system to do the job; status of data on the candidate computer system (e.g., is your database journal current to Mar. 15, 1999?); an estimate of time or CPU cycles required to perform the job; memory required to run the job; and disk space required to run the job. Job attributes 310 thus describe pre-requisites for the job in a way that gives enough information to the candidate computer systems that they know whether or not they are capable of accepting the job to be shared.

Network attributes 320 include information relating to required network performance for a computer system to accept a job. Examples of suitable network performance attributes are ping time, hops from a host, connection speed, and network congestion. Ping time refers to the time it takes a candidate computer system to reply to a request from a recruiter, and is usually specified in milliseconds. Specifying a maximum allowable ping time allows the recruiter to limit candidate computer systems to those that are reasonably close to the recruiter, and therefore have a fast ping time. The rationale for providing this ping time attribute is that it wouldn't make much sense for a computer in China to share a job with a computer in Mexico if other closer computer systems could be used. Specifying maximum ping time is an easy way to restrict candidate computer systems to those that can be communicated with relatively quickly.

Hops from a host is another suitable network attribute that specifies how many routers are passed through to go between the recruiter and the candidate. Hops from a host is another measure of network performance, so the prospective candidates can be limited, for example, to those systems that are no more than two hops from the recruiter. Another measure of network performance is connection speed. Specifying minimum connection speed allows a recruiter to specify the minimum required bandwidth for job sharing. If a job to be shared requires 200 megabytes to be loaded on the candidate computer system, a minimum connection speed could be specified to prevent low bandwidth computers (such as those that have a 28.8 kbps modem connection) from accepting the job. Another measure of network performance is network congestion, which is a measure of how busy a network is. For example, a computer system might have a 1 megabit per second network connection speed, but the network is so congested that only 10 Kbit per second is getting through to the candidate computer system. Specifying allowable network congestion in bits per second of network throughput prevents overly-congested candidates from accepting the job.

Security attributes 330 allow specifying parameters that further limit which candidate computer systems can accept a job to be shared. The reasons for providing security attributes 330 is to prevent some types of jobs from being shared with some types of computer systems. In other words, a software compile job in a computer system that is in a software development group might be shared with an available candidate computer system in the accounting department, but payroll processing from the accounting department would probably not be allowed on computer systems in the software development group. A compile job of a proprietary computer program in the software group would likely be limited to the computers within the company, and may be further limited to computers within a particular group. Security attributes 330 allow specifying that the candidate computer systems must be in the same group or same company In addition, other security attributes 330 may be defined to restrict job sharing to a predefined type of candidate computer system.

Note that other security measures may also be taken to assure the integrity of the job sharing system. For example, when a candidate computer system signals to the recruiter that it accepts a job, the recruiter could then require the candidate to enter a password or other identifying information to assure the candidate is authorized to receive the job. In addition, access to the IP multicast address could be restricted so that only authorized computer systems know how to register for job sharing of a particular type. These and other security measures are within the scope of the preferred embodiments.

Figure 4:
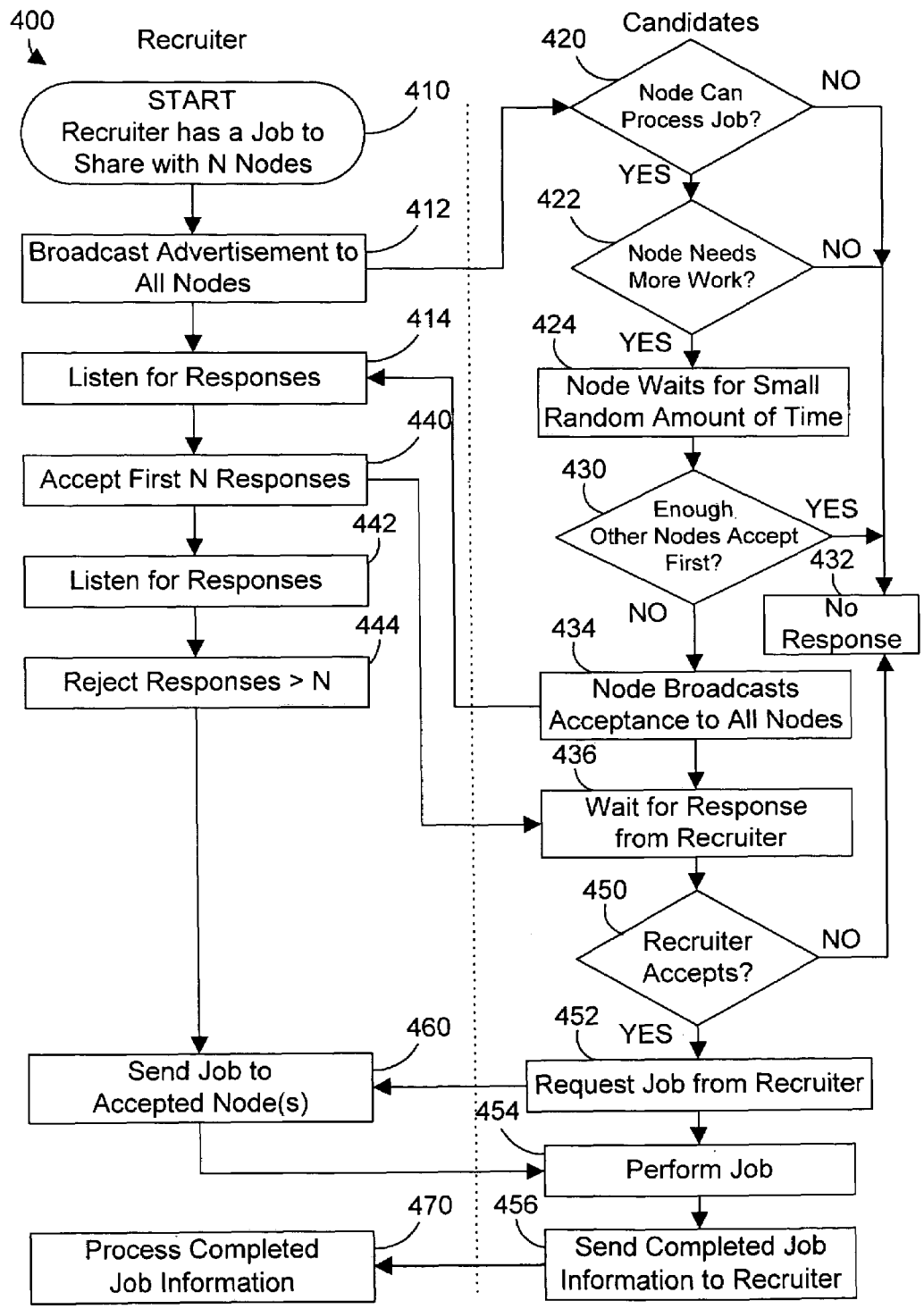
FIG. 4 is a flow diagram illustrating a method for sharing jobs via IP multicast in accordance with the preferred embodiments.

Referring to FIG. 4, a method 400 for sharing a job in accordance with the present invention starts when a recruiter computer system has a job to share (step 410). Part of the job sharing parameters for the job to be shared might include the number of nodes N that are needed to process the job. For the flow diagram of FIG. 4, the term "node" is used to refer to computer systems on the network, as is known in the art. Note that the flow diagram of FIG. 4 is divided by a vertical dotted line, with the left half representing the flow steps for the recruiter, and the right half representing the flow steps for each candidate node. The recruiter makes its desire to share the job known by broadcasting an advertisement to all nodes on the network (step 412). The recruiter's advertisement preferably includes job sharing parameters 129 that specify attributes that a candidate must satisfy to be able to accept the job to be shared. The broadcasting of the recruiter's advertisement in the preferred embodiment corresponds to sending a message to the IP multicast router 210, which then transmits the message to all registered nodes (i.e., candidates).

When a candidate node receives the advertisement from the recruiter via the IP multicast router 210, it then determines whether it satisfies all the attributes specified in the job sharing parameters. In other words, the candidate determines if it has the proper software installed to run the job, if it has sufficient memory and hard disk space, and if it satisfies the network performance attributes and security attributes, etc. If the candidate node does not satisfy all of the specified job sharing parameters (step 420=NO), the candidate node does not reply to the advertisement from the recruiter (step 432). By simply not responding, as opposed to sending a rejection message, network traffic is minimized. If the candidate node determines that it satisfies all job sharing parameters, and can therefore process the job (step 420=YES), the node then determines whether it needs more work (step 422). Note that the order of steps 420 and 422 may be reversed. If the node does not need any more work (step 422=NO), the node does not respond to the recruiter's advertisement (step 432). If the node needs more work (step 422=YES), it waits for a small random amount of time (step 424) to see if enough other nodes will respond to the recruiter's request. What constitutes a "small" amount of time may be defined in terms of the properties of the network. For example, most nodes should wait at least the time it takes a packet to get to all nodes on the network under normal network load. Making each node wait a small random amount of time to see how many nodes respond prevents all nodes from simultaneously accepting the job, which would leave to the recruiter the potentially complex task of determining which nodes to actually give the job to. By waiting for a small random amount of time, it is more likely that responses from candidate nodes will be spread out over time rather than occurring nearly simultaneously.

After the random wait, if enough other nodes have already accepted (step 430=YES), this candidate node does not respond (step 432) because enough candidates have already been recruited. If not enough nodes have accepted (step 430=NO), the node broadcasts is acceptance to all nodes (step 434). In the preferred embodiment, this acceptance is also via IP multicast to allow other candidate nodes to monitor when a node accepts the job in step 430. Meantime, the recruiter listens for responses to the recruiting advertisement (step 414), and accepts the first N responses (step 440). The recruiter then sends a response to the node's acceptance that was sent in step 434, accepting the first N responses and rejecting other responses (step 440). The response message from the recruiter could be sent to the node via IP multicast, but is more likely a unicast message to only the affected node. Meanwhile, the node is awaiting a response from the advertiser (step 436). If the response is that the recruiter does not accept the node's acceptance sent in step 434 (step 450=NO), the node makes no response (step 432). If the recruiter accepts the node's acceptance in step 434 (step 450=YES), the node then requests the job from the recruiter (step 452), which sends the job to the node (step 460). The node then performs the job (step 454), and sends the completed job information to the recruiter (step 456). The recruiter takes this processed job information and uses it, in conjunction with the processed job results from the other nodes, to process the information to complete the overall job (step 470). Note that the communication between recruiter and candidate in steps 440 through 470 of FIG. 4 are preferably performed in a unicast manner, directly between recruiter and candidate, rather than cluttering the IP multicast network with information that is only of use to these two computer systems.

The present invention allows for job sharing via IP multicast without requiring any job-specific intelligence to be put on potential job sharing candidate computer systems. The pre-requisites for performing the job are specified in the job sharing parameters. A candidate examines the job sharing parameter to see if it qualifies to take on the shared job. It is even possible to download executable software from the recruiter to the candidate so the candidate can then process the job using the downloaded software. Job sharing using IP multicast is greatly simplified over the prior art methods for job sharing, which require job-specific intelligence to be installed on each candidate. When a computer system has a job to be shared, it sends a recruiting message via IP multicast that includes an advertisement for the job along with the job sharing parameters. Each candidate examiners the job sharing parameters to determine if it qualifies to do the job. If so, the candidate can respond to the recruiter by accepting the job. Assuming that the recruiter accepts the candidate's response, the job is then passed from the recruiter to the candidate, which processes the job and returns the result to the recruiter. In this manner large computational problems may be distributed in discrete pieces to different computer systems on a computer network.

The most readily apparent application for job sharing in accordance with the present invention is in a company network, such as an Intranet, that interconnects computer systems within a company. This type of job sharing could be tightly controlled using security attributes, password authorization, etc. However, the invention can also be applied to a much larger scale in a much less secure environment. Computers on the Internet could register to share jobs when they have spare computing capacity. For example, the Search for Extraterrestrial Intelligence agency of the U.S. government (SETI) has collected huge amounts of data regarding transmissions and celestial phenomena that needs to be processed. This type of mundane, non-secure processing could very easily be accomplished by sharing portions of the job with many computers on the Internet. The present invention expressly extends to job sharing between computers using IP multicast, regardless of the size of the job and the number or type of computers on the network.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

We claim:

1. A computer-implemented method for sharing jobs between computers systems on a network that each include a job sharing processor residing in a memory, the method comprising the steps of:

the job sharing processor in a first computer system on the network broadcasting to job sharing processors in the other computer systems via IP multicast when the first computer system has a job to share;

the job sharing processor in each other computer system on the network responding to the broadcast from the job sharing processor of the first computer system to accept the job to share if the computer system satisfies at least one parameter transmitted by the job sharing processor in the first computer system for accepting the job to share.

2. The method of claim 1 wherein a job sharing processor in a selected computer system only responds to the broadcast from the job sharing processor in the first computer system when the selected computer system needs more work.

3. The method of claim 1 wherein the a job sharing processor in a selected computer system only responds to the broadcast from the first computer system when the selected computer system detects that an insufficient number of computer systems have responded to the broadcast from the job sharing processor in the first computer system.

4. The method of claim 1 further including the step of:

each computer system on the network that wants to share jobs registering for job sharing, said step of registering for job sharing making the computer system a job sharing candidate.

5. The method of claim 1 further including the step of:

defining at least one parameter for a job to be shared on the network.

6. The method of claim 5 wherein the at least one parameter includes at least one job attribute that defines at least one characteristic of the job to be shared.

7. The method of claim 5 wherein the at least one parameter includes at least one network attribute that defines network performance requirements that job sharing candidates must meet to accept the job to be shared.

8. The method of claim 5 wherein the at least one parameter includes at least one security attribute that defines security requirements that job sharing candidates must meet to accept the job to be shared.

* * * * *